US010302247B2

(12) United States Patent
Forrest et al.

(10) Patent No.: US 10,302,247 B2
(45) Date of Patent: May 28, 2019

(54) BACK PLATE ASSEMBLIES FOR HOME HARDWARE

(71) Applicant: LIBERTY HARDWARE MFG. CORP., Winston-Salem, NC (US)

(72) Inventors: Earl David Forrest, Asheboro, NC (US); Neil Thomas Edwards, Kernersville, NC (US); James Leroy Daniels, Stokesdale, NC (US)

(73) Assignee: LIBERTY HARDWARE MFG. CORP., Winston-Salem, NC (US)

( * ) Notice: Subject to any disclaimer, the term of this patent is extended or adjusted under 35 U.S.C. 154(b) by 0 days.

(21) Appl. No.: 15/835,862

(22) Filed: Dec. 8, 2017

(65) Prior Publication Data

US 2018/0100617 A1    Apr. 12, 2018

Related U.S. Application Data

(62) Division of application No. 15/281,546, filed on Sep. 30, 2016, now Pat. No. 9,869,424.

(51) Int. Cl.

| F16M 13/02 | (2006.01) |
|---|---|
| A47H 1/022 | (2006.01) |
| A47H 1/102 | (2006.01) |
| A47K 3/38 | (2006.01) |
| A47K 10/12 | (2006.01) |
| A47K 10/38 | (2006.01) |
| F16B 45/00 | (2006.01) |

(52) U.S. Cl.
CPC ............. *F16M 13/02* (2013.01); *A47H 1/022* (2013.01); *A47H 1/102* (2013.01); *A47K 3/38* (2013.01); *A47K 10/12* (2013.01); *A47K 10/38* (2013.01); *F16B 45/00* (2013.01); *A47K 2201/02* (2013.01)

(58) Field of Classification Search
CPC ........ A47H 1/022; A47H 1/102; A47K 10/12; A47K 10/38; A47K 2201/02; A47K 3/38; F16M 13/02; F16B 45/00; H01R 13/625
USPC ............... 248/220.22, 220.31, 304; 403/353, 403/348–349
See application file for complete search history.

(56) References Cited

U.S. PATENT DOCUMENTS

| 1,510,978 A * | 10/1924 | Conklin ................ F16B 5/10 248/304 |
|---|---|---|
| 1,867,206 A * | 7/1932 | Brady ................ H01B 17/20 174/158 R |
| 4,372,450 A | 2/1983 | Licari et al. |

(Continued)

*Primary Examiner* — Christopher Garft
(74) *Attorney, Agent, or Firm* — Brooks Kushman P.C.; Lora Graentzdoerffer

(57) ABSTRACT

A back plate assembly for home hardware is provided with a base and an attachment. The base includes at least one mount aperture and is adapted to be mounted to a support surface. The base defines a receptacle, a through-hole, a pair of grooves disposed at an outer edge of the through-hole, and a pair of ledges offset from an inner edge of the through-hole. The attachment includes a lock member with a pair of lock features and a connector member sized for insertion between the pair of ledges when the attachment is oriented in a first radial position. Each of the pair of lock features is positioned on the attachment for insertion within one of the grooves and the connector member is sized to rest upon the ledges when the connector member extends through the through-hole and the attachment is rotated to a second radial position.

7 Claims, 7 Drawing Sheets

(56) References Cited

U.S. PATENT DOCUMENTS

| | | | |
|---|---|---|---|
| 5,407,293 A * | 4/1995 | Crainich | A61B 17/29 403/322.1 |
| 2011/0101183 A1 | 5/2011 | Ernst et al. | |
| 2011/0155875 A1 * | 6/2011 | Hofman | A47F 5/0815 248/220.31 |
| 2014/0138505 A1 * | 5/2014 | Maclaren-Taylor | A47K 10/10 248/231.61 |

* cited by examiner

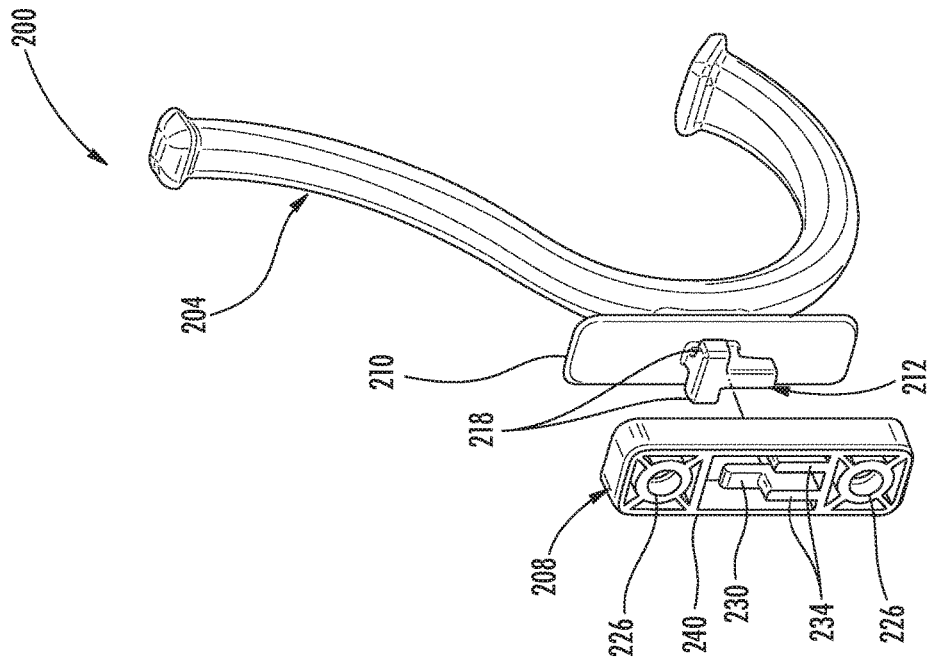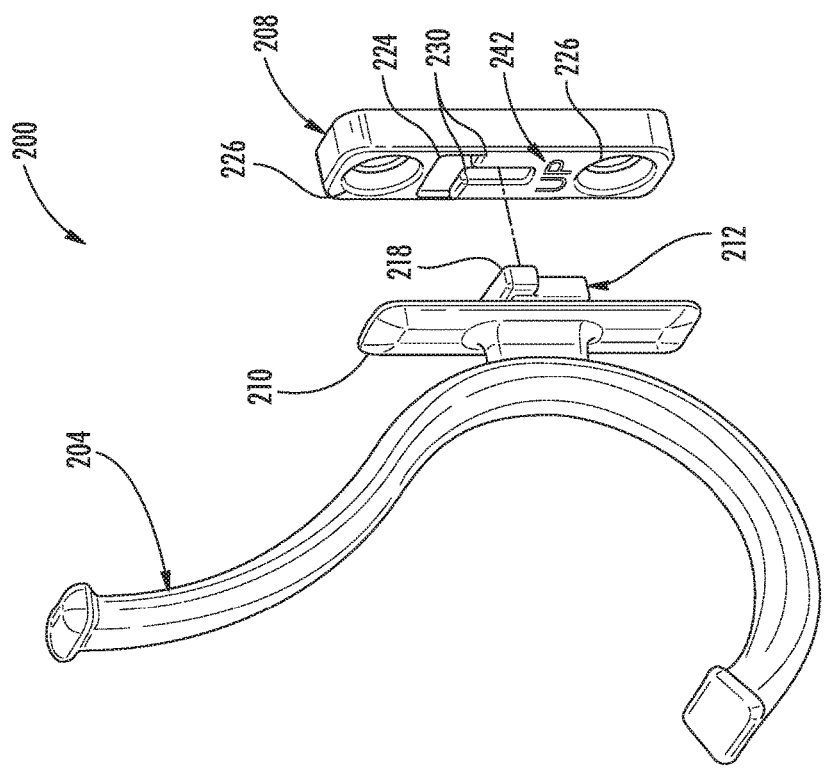

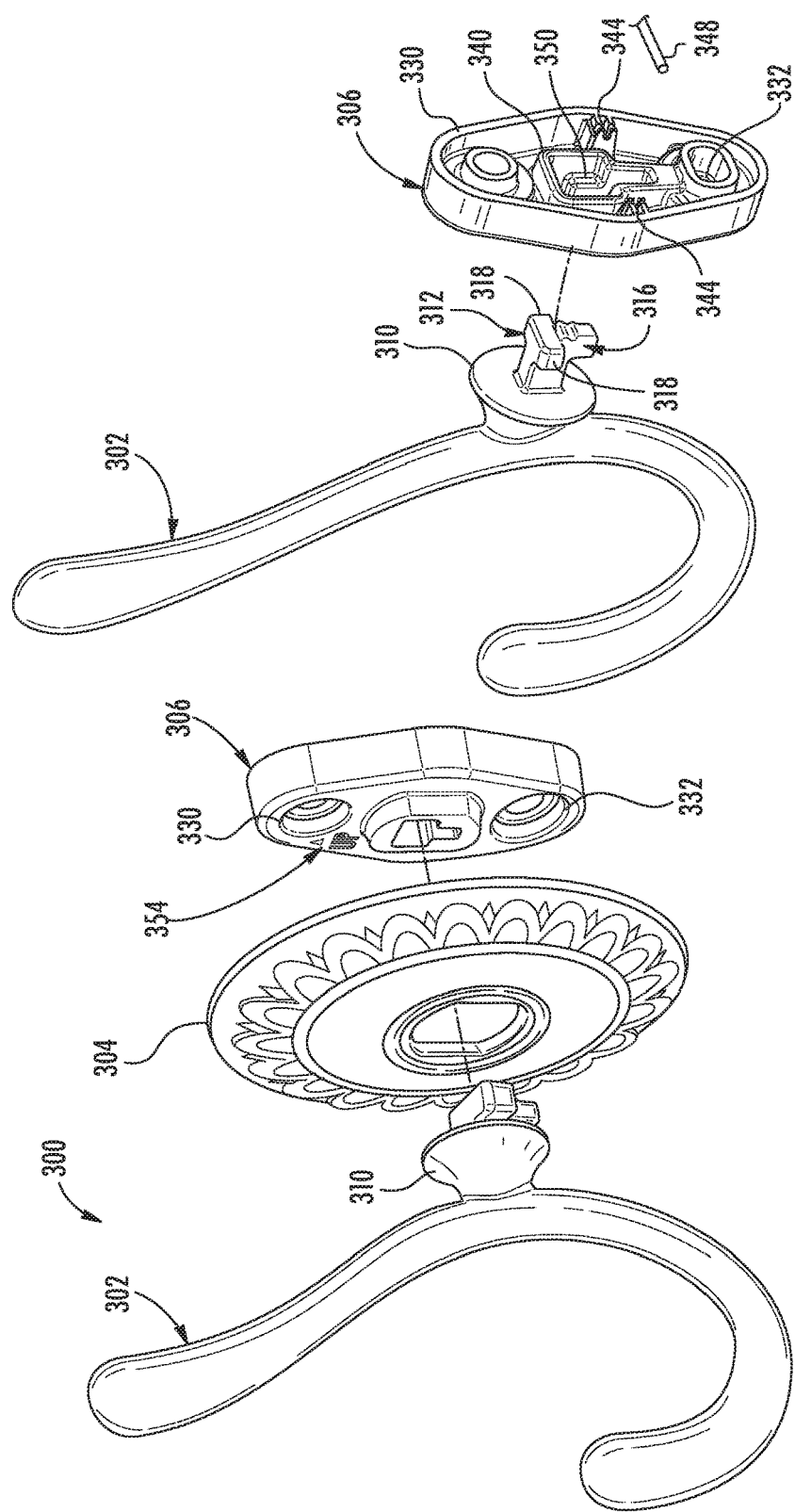

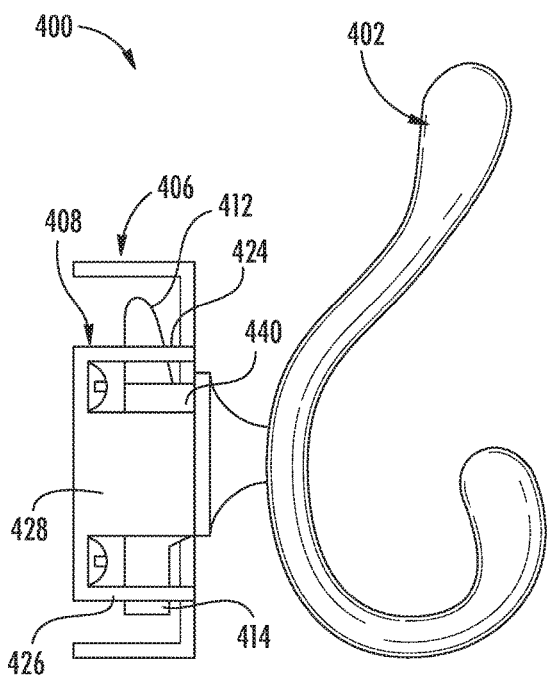
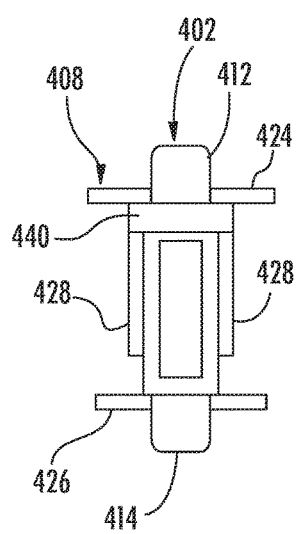
FIG. 14    FIG. 15
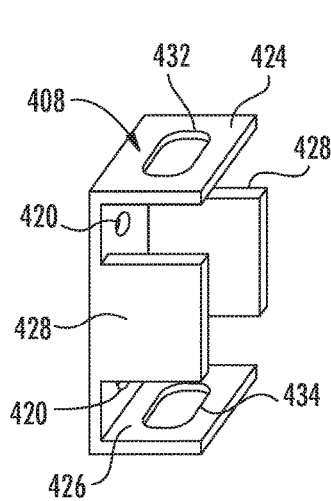
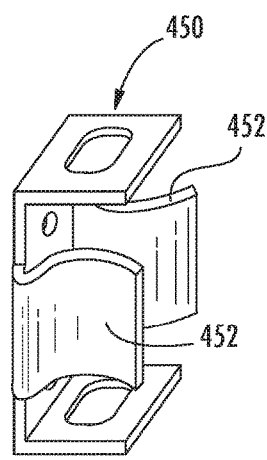
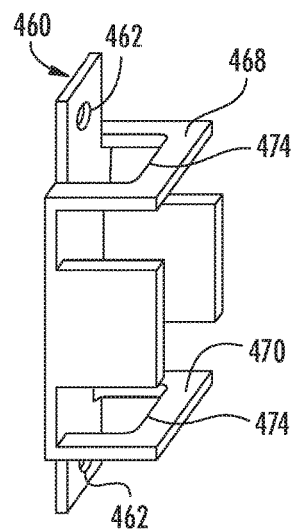
FIG. 16    FIG. 17    FIG. 18

BACK PLATE ASSEMBLIES FOR HOME HARDWARE

CROSS-REFERENCE TO RELATED APPLICATION

This application is a division of U.S. application Ser. No. 15/281,546 filed Sep. 30, 2016, now U.S. Pat. No. 9,869,424, the disclosure of which is hereby incorporated in its entirety by reference herein.

TECHNICAL FIELD

Various embodiments relate to back plate assemblies for home hardware.

BACKGROUND

Existing home hardware back plate assemblies typically include an attachment and base for mounting to a surface. Examples of attachments include a hook, shower rod, and toilet paper roll holder. The back plate assemblies may require complex tool designs with several moving parts which may increase wear on the tools and potentially reduce tool life. These assemblies may also include covers with large surface areas and profiles which may require additional shelf space in a retail environment.

SUMMARY

According to at least one embodiment, a twist-lock back plate assembly for home hardware is provided with a base and an attachment. The base includes at least one mount aperture and is adapted to be mounted to a support surface. The base defines a receptacle, a through-hole, a pair of grooves disposed at an outer edge of the through-hole, and a pair of ledges offset from an inner edge of the through-hole. The attachment includes a lock member with a pair of lock features and a connector member sized for insertion between the pair of ledges when the attachment is oriented in a first radial position. Each of the pair of lock features is positioned on the attachment for insertion within one of the grooves and the connector member is sized to rest upon the ledges when the connector member extends through the through-hole and the attachment is rotated to a second radial position. The connector member may be spaced from the lock member a distance sufficient for a decorative cover to be mounted therebetween. The assembly may include a decorative cover sized for disposal between the base and attachment and to conceal the base. The attachment may further include one of a hook, a telescoping shower rod, a towel bar post, a towel ring post, and a toilet paper holder post. The through-hole may be sized for rotation of the lock member and lock features until each of the lock features sits within one of the pair of grooves. Each of the grooves and each of the lock features may define a taper to permit annular deformation of the base when the attachment is mounted to the base and a force is applied to the attachment. The ledges and attachment may be arranged with one another such that the attachment is prevented from moving in a direction away from the support surface when the attachment is oriented in the second radial position.

According to at least another embodiment, a slide-lock back plate assembly for home hardware is provided with an attachment and a base. The attachment includes a connector with first and second intersecting members. The base defines an attachment opening sized to receive the first intersecting member, at least one mount aperture, and a pair of arms adjacent the attachment opening and spaced from one another to receive the second intersecting member therebetween. The base is adapted to be mounted to a support surface. An upper portion of the connector is sized for insertion of the first intersecting member within the attachment opening, then lateral translation such that the second intersecting member is secured between the arms. The base may further define a pair of flexible tabs each extending from one of the pair of arms and each including a lip sized to partially overlap a portion of the connector. Each of the pair of flexible tabs may be arranged with the arms to receive a portion of a force applied to the attachment when the attachment is mated to the base. A cover plate may be integrated with the attachment as a single component to conceal the attachment opening and the at least one mount aperture. The base may include indicia indicative of a base orientation for mounting the base to a surface. The attachment may further include one of a hook, a telescoping shower rod, a towel bar post, a towel ring post, and a toilet paper holder post. The connector may be T-shaped.

According to at least another embodiment, a wedge-lock back plate assembly for home hardware is provided with a base, an attachment, and a rod. The base defines a first mount aperture, an opening, and a pair of forks each disposed on one side of the opening. The base is adapted to mount to a support surface. The attachment includes a transition portion and a connector with first and second intersecting members defining an engagement groove. The rod is for securing within each of the pair of forks and arranged with the opening for positioning within the engagement groove when the connector extends through the opening such that a portion of a force applied to the attachment is transferred to the rod. The forks may be oriented upon the base to face the support surface. The assembly may include a cover plate sized for disposal between the transition portion and an outer surface of the base to conceal the base. The base may further include indicia indicative of a base orientation for mounting the base to the support surface. The rod may be arranged with the base such that a user experiences a tactile feedback when the engagement groove receives the rod. The attachment may further include one of a hook, a towel bar mount, a telescoping shower rod, a portion of a dual mount towel bar assembly, a towel bar post, a towel ring post, and a toilet paper holder post.

According to at least another embodiment, a back plate assembly for home hardware is provided with an attachment and a bracket. The attachment includes a first member, a second member, and a support member. The bracket defines at least one mount aperture and includes an upper flange defining a first opening, a lower flange defining a second opening, and a pair of side flanges. The first member is sized for insertion within the first opening and the second member is sized for insertion within the second opening such that the support member rests upon the pair of side flanges to transfer a load applied to the attachment to the side flanges. The bracket may be made of a stamped steel or spring steel. The first opening may be spaced from a wall end of the upper flange to provide space for disposal of a cover between the attachment and bracket to conceal the bracket. Each of the pair of side flanges may define an arcuate shape. The mount aperture may be defined by the bracket at a location above the upper flange. The first opening and the second opening may be arranged with one another such that the attachment rests against a surface of the bracket defining the mount aperture.

BRIEF DESCRIPTION OF THE DRAWINGS

FIG. 7 is a front perspective view of an example of a back plate assembly for home hardware according to another embodiment showing two components separated from one another;

FIG. 8 is a rear perspective view of the example of the back plate assembly of FIG. 8;

FIG. 11 is a front perspective view of an example of a back plate assembly for home hardware according to another embodiment showing three components separated from one another;

FIG. 12 is a rear perspective view of two of the components of the back plate assembly of FIG. 11;

FIG. 14 is a side view of an example of a back plate assembly for home hardware according to another embodiment showing three components mated with one another;

FIG. 15 is a front view, in cross-section, of a portion of the back plate assembly of FIG. 14;

FIG. 16 is a perspective view of an example of a bracket of the back plate assembly of FIG. 14;

FIG. 17 is a perspective view of another example of a bracket of the back plate assembly of FIG. 14; and FIG. 18 is a perspective view of another example of a bracket of the back plate assembly of FIG. 14.

DETAILED DESCRIPTION

As required, detailed embodiments of the present invention are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present embodiments.

Figure 1:
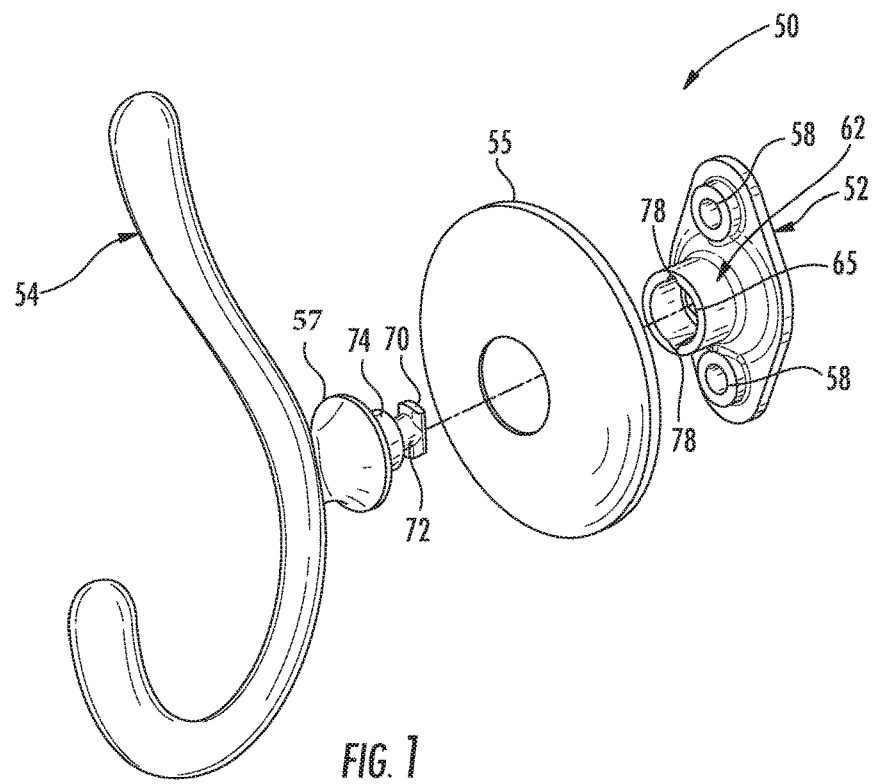
FIG. 1 is an exploded view of an example of a back plate assembly for home hardware according to an embodiment.

FIG. 1 shows an example of a back plate assembly, referred to generally as a back plate assembly 50 herein. The back plate assembly 50 may implement a twist-lock design and include a base 52, an attachment 54, and a cover 55 and may be used, for example, to support home hardware in various portions of a home. The base 52 may be made of an engineered polymer suited for snap-fit features while having characteristics to sustain load concentrations. The attachment 54 may include a flared end 57. In this example the attachment 54 is shown as a hook, however it is contemplated that the attachment 54 may be various other types of attachments, such as a telescoping shower rod, a towel bar post, a towel ring post, and a toilet paper holder post. The cover 55 may be stylized in various patterns and shapes. The cover 55 may be sized for disposal between the base 52 and the attachment 54 such that the base 52 is concealed. It is contemplated that the cover 55 may be integrated as one component with the attachment 54 or the base 52. The back plate assembly 50 may be mounted to a surface, such as a wall.

Figure 2:
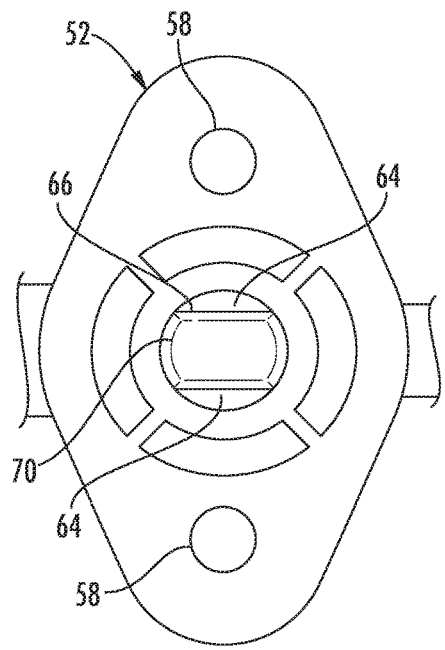
FIG. 2 is a rear view of a portion of the back plate assembly of FIG. 1.
Figure 3:
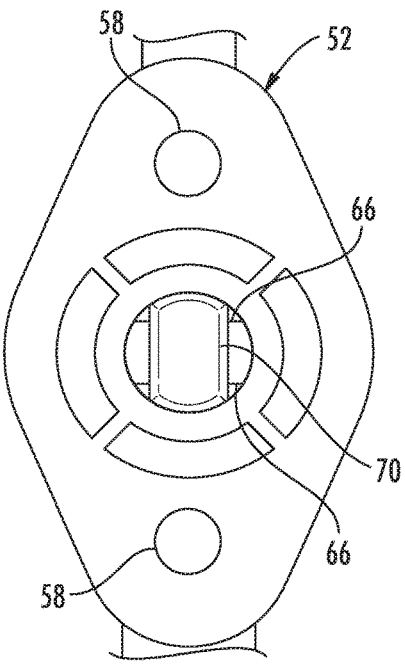
FIG. 3 is another rear view of a portion of the back plate assembly of FIG. 1.

FIGS. 2 and 3 show further detail of the base 52 from a rear view. The base 52 may define a pair of mount apertures 58. The mount apertures 58 may be sized to receive a fastener, such as a screw, for mounting the base 52 to a surface. The base 52 includes a cup portion 62 defining a pair of ledges 64 and a through-hole 65. The cup portion 62 may also be referred to as a receptacle herein. The ledges 64 may be offset from an inner edge of the through-hole 65. The cup portion 62 and the ledges 64 define an opening 66 sized to receive a portion of the attachment 54 to assist in securing the attachment 54 to the base 52. For example, the attachment 54 may include a connector member 70, a shaft 72, and a lock member 74. The opening 66 of the base 52 may be sized to receive the connector member 70 of the attachment 54. The connector member 70 may be spaced from the lock member 74 such that the attachment 54 may engage with the base 52 following insertion and rotation of the attachment 54. For example, FIG. 2 shows the connect member 70 inserted within the opening 66. In this position, the attachment 54 is oriented in a horizontal configuration. FIG. 3 shows the connect member 70 rotated from the orientation in FIG. 2 such that the connect member 70 rests upon the ledges 64. In this position, the attachment 54 is oriented in an upright position. The ledges 64 prevent the attachment 54 from moving in a direction away from the mounting surface when the attachment 54 is oriented in the upright position.

Figure 4:
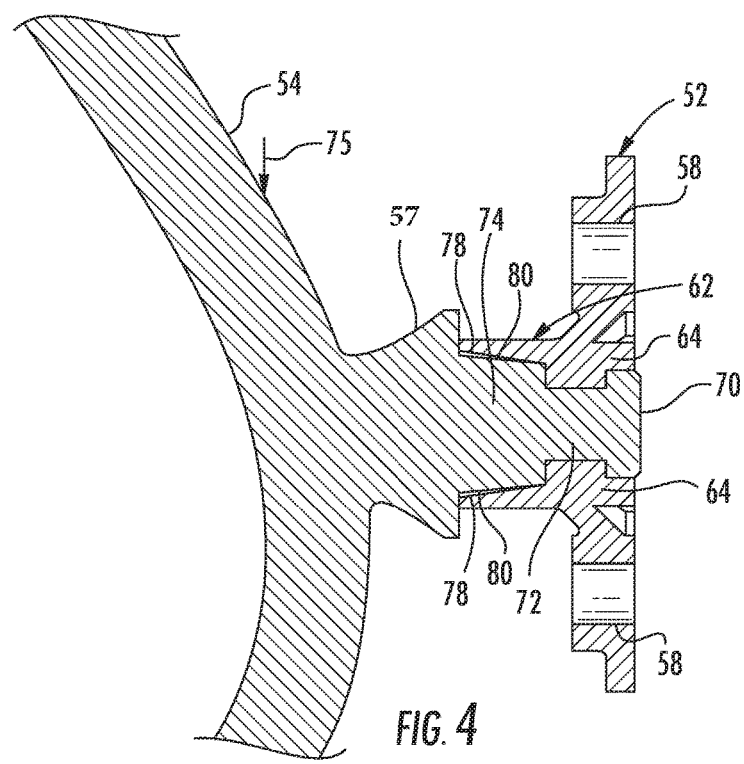
FIG. 4 is a side view, in cross-section, of a portion of the back plate assembly of FIG. 1.

FIG. 4 shows a side view, in cross-section, of the attachment 54 mounted to the base 52 and oriented in the upright position. A force applied to the attachment 54, such as a force represented by force arrow 75, is disbursed to the base 52 via cantilevered principles. For example, the ledges 64 may assist in receiving the force represented by force arrow 75 when an object is placed upon the attachment 54.

Figure 5:
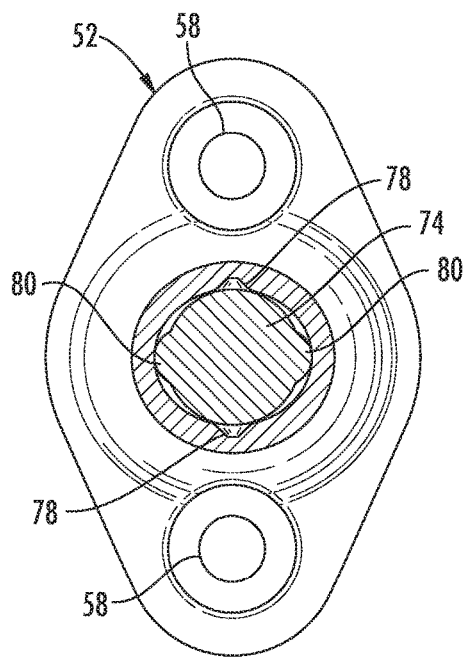
FIG. 5 is a front view of a base of the back plate assembly of FIG. 1 with a portion of an attachment shown in partial cross-section.
Figure 6:
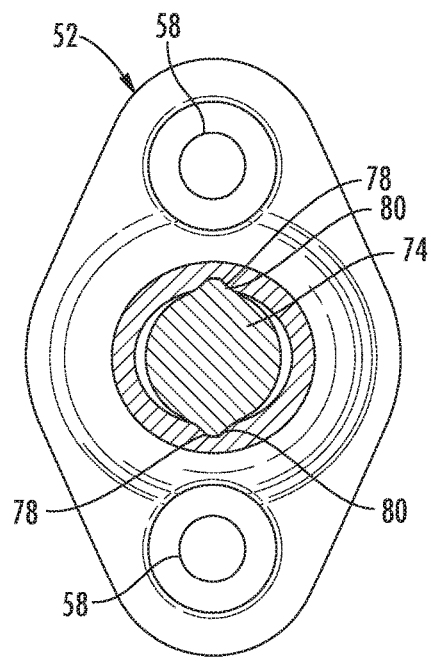
FIG. 6 is a front view of a base of the back plate assembly of FIG. 1 with a portion of an attachment shown in partial cross-section.

FIGS. 5 and 6 show further detail of the base 52 from a front view and include a partial cross-section of a portion of the attachment 54. The cup portion 62 defines a pair of grooves 78. Each of the grooves 78 may be shaped as a V or other suitable shape and may be disposed at an outer edge of the through-hole 65. The lock member 74 defines a pair of lock features 80 each sized for disposal within one of the grooves 78. Each of the grooves 78 and the lock members 74 may define a taper to permit annular deformation of the cup portion 62 of the base 52. To mount the back plate assembly 50 to a wall, a user may first secure the base 52 to the wall via fasteners extending through the mount apertures 58. The cover 55 may then be positioned upon the base 52. The user may then align the attachment 54 in the horizontal configuration to insert the connector member 70 into the opening 66. The user may then rotate the attachment 54 such that each of the lock features 80 sit snugly within the respective groove 78 and such that the connector member 70 is retained via the ledges 64.

FIGS. 7 and 8 show another example of a back plate assembly, referred to generally as a back plate assembly 200 herein. The back plate assembly 200 may implement a slide-lock design and include an attachment 204 and a base 208 and may be used, for example, to support home hardware in various portions of a home. In this example the attachment 204 is shown as a hook, however it is contemplated that the attachment 204 may be various other types of attachments, such as a telescoping shower rod, a portion of a dual mount towel bar assembly, a towel bar post, a towel ring post, and a toilet paper holder post. The attachment 204 includes a cover 210 and a connector member 212. The cover 210 may be stylized in various different shapes and patterns. The connector member 212 may define a T-shape including ends 218. The connector member 212 may include intersecting members.

The base 208 may define an opening 224 and a pair of mount apertures 226. The opening 224 may be sized to receive the connector member 212. Each of the mount apertures 226 may be sized to receive a fastener, such as a screw, to assist in securing the base 208 to a surface, such as a wall. The base 208 may include features to assist in mounting the attachment 204 thereto.

Figure 10:
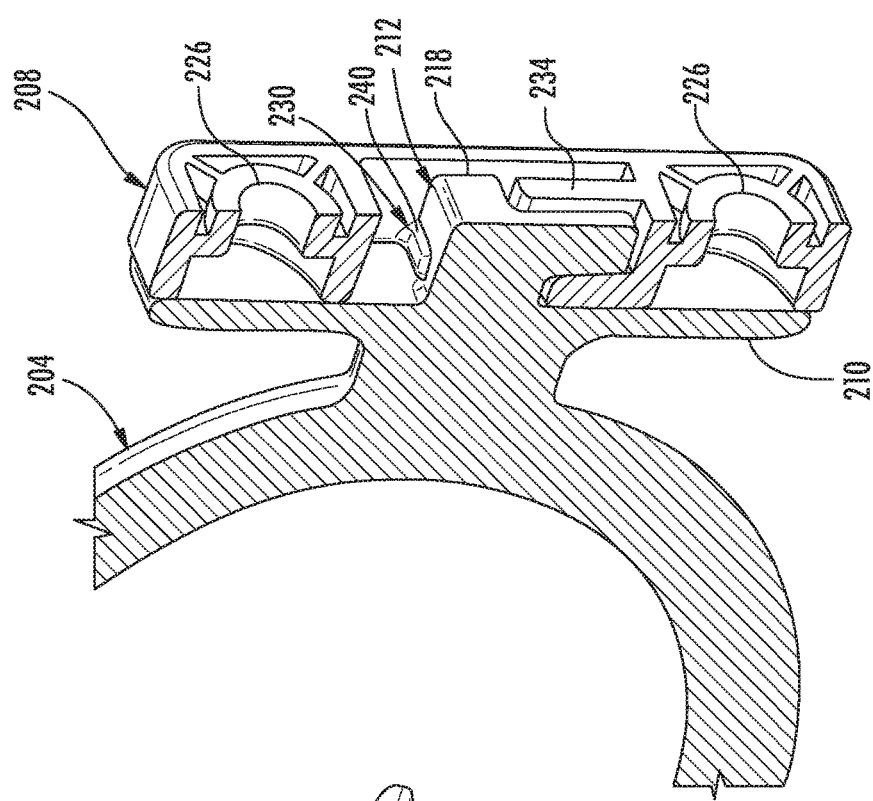
FIG. 10 is a perspective view, in cross-section, of the example of the back plate assembly of FIG. 7 showing the two components mated with one another.
Figure 9:
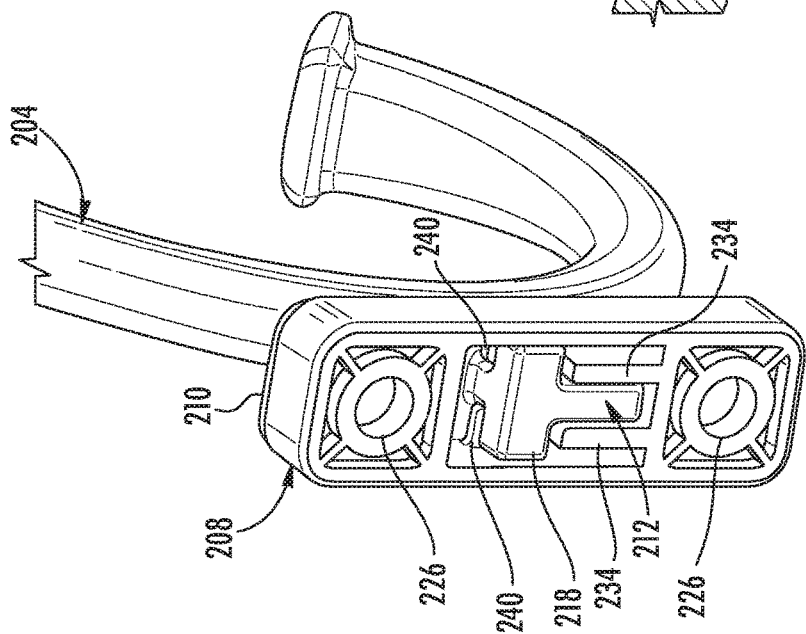
FIG. 9 is a rear perspective view of the example of the back plate assembly of FIG. 7 showing the two components mated with one another.

FIGS. 9 and 10 show further detail of the back plate assembly 200 in which the attachment 204 is shown mounted to the base 208. The base 208 may include a pair of flexible tabs 230 and a pair of arms 234. Each of the pair of tabs 230 and the pair of arms 234 may be arranged with the base 208 to assist in grasping the connector member 212 to secure the attachment 204 to the base 208. For example, each of the ends 218 of the connector member 212 may be sized to fit within an upper portion of the opening 224. The connector member 212 may then slide downward such that a lip 240 on each of the pair of tabs 230 partially overlaps the ends 218 of the connector member 212 to secure the connector member 212 in position. In another example, Each of the pair of tabs 230 may not include the lip 240 partially overlapping the ends 218. The arms 234 may be spaced from one another to receive a lower portion of the connector member 212. As such, the pair of arms 234 and the pair of tabs 230 may assist in receiving a force applied to the attachment 204, such as when an item is placed thereupon.

Optionally, each of the pair of tabs 230 may also be of a material with flexible characteristics to flex when the ends 218 of the connector member 212 press there against to further assist in securing the attachment 204 to the base 208. The base 208 may include indicia, such as indicia 242, to assist in orienting the base 208 relative to a mount surface.

Figure 13:
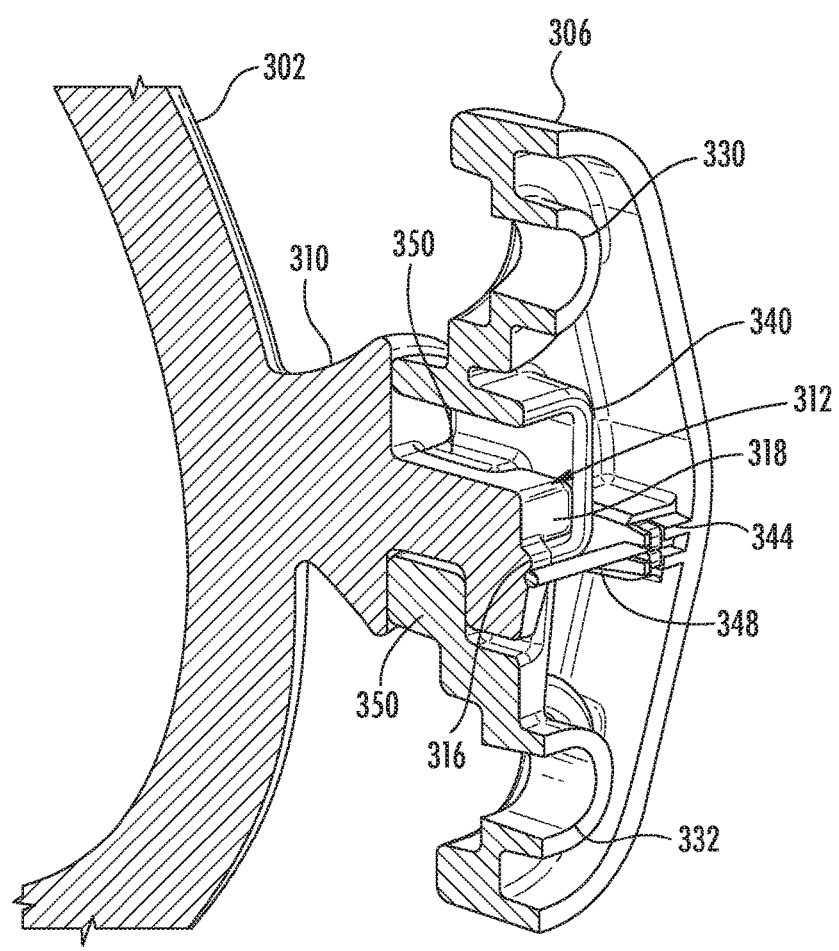
FIG. 13 is a perspective view, in cross-section, of the example of the back plate assembly of FIG. 11 showing two of the components mated with one another.

FIGS. 11 through 13 show another example of a back plate assembly, referred to generally as a back plate assembly 300 herein. The back plate assembly 300 may implement a wedge-lock design and include an attachment 302, a cover plate 304, and a base 306 and may be used, for example, to support home hardware in various portions of a home. In this example the attachment 302 is shown as a hook, however it is contemplated that the attachment 302 may be various other types of attachments, such as a telescoping shower rod, a portion of a dual mount towel bar assembly, a towel bar post, a towel ring post, and a toilet paper holder post. The cover plate 304 may be stylized in various patterns and shapes. It is contemplated that the cover plate 304 may be integrated as one component with the attachment 302 or the base 306. The back plate assembly 300 may be mounted to a surface, such as a wall.

The attachment 302 includes a transition portion 310 and a connector member 312. The connector member 312 may define a T-shape, an engagement groove 316, and ends 318. The connector member 312 is spaced from the transition portion 310 to accommodate positioning of the cover plate 304 between the attachment 302 and the base 306.

The base 306 defines a first receiving aperture 330 and a second receiving aperture 332. The first receiving aperture 330 and the second receiving aperture 332 are sized to receive fasteners to assist in mounting the base 306 to a surface. The second receiving aperture 332 may define an oval shape to provide additional clearance for a fastener to allow an installer to rotatably adjust the base 306 using the first receiving aperture 330 as a center of rotation to facilitate alignment of the attachment 302 to a desired vertical position. The base 306 defines an opening 340 sized to receive the connector member 312 and a pair of forks 344 sized to receive a rod 348. For example, ends of each of the pair of forks 344 may be sized such that the rod 348 may be secured therein. Each of the pair of forks 344 may be oriented upon the base 306 to face a mount surface. The rod 348 may be, for example, a spring wire.

The base 306 may include portions 350 adjacent the opening 340. The portions 350 may be sized to orient the connector member 312 such that the engagement groove 316 aligns with the rod 348. For example, the portions 350 may be spaced from an upper edge of the opening 340 such that the connector member 312 may be inserted into the opening 340 and then moved downward for the engagement groove 316 and the rod 348 to mate with one another for securing the attachment 302 to the base 306 and such that the rod 348 and the portions 350 support the attachment 302 when a force is applied thereto. A user may experience a tactile feedback when mounting the attachment 302 to the base 306 due to the mating of the engagement groove 316 and the rod 348. Optionally, the base 306 may include indicia, such as indicia 354, to assist in orienting the base 306 relative to a mount surface.

FIGS. 14 through 16 show another example of a back plate assembly, referred to generally as a back plate assembly 400 herein. The back plate assembly 400 includes an attachment 402, a cover plate 406, and a mount bracket 408 and may be used, for example, to support home hardware in various portions of a home. The mount bracket 408 may be made of, for example, stamped steel or spring steel. In this example the attachment 402 is shown as a hook, however it is contemplated that the attachment 402 may be various other types of attachments, such as a telescoping shower rod, a portion of a dual mount towel bar assembly, a portion of a toilet paper roll mount, and a towel ring post. The cover plate 406 may be stylized in various patterns and shapes. It is contemplated that the cover plate 406 may be integrated as one component with the attachment 402 or the mount bracket 408. The back plate assembly 400 may be mounted to a surface, such as a wall.

FIG. 15 is a front view, in cross-section of a portion of the back plate assembly 400. A base portion of the attachment 402 may include a first member 412 and a second member 414. The mount bracket 408 may define a pair of fastener apertures 420 each sized to receive a fastener to assist in securing the mount bracket 408 to a surface. The mount bracket 408 may include a plurality of flanges. For example, the mount bracket 408 may include a first flange 424, a second flange 426, and a pair of support flanges 428. The first flange 424 may define a first opening 432 and the second flange 426 may define a second opening 434.

The first opening 432 may be sized to receive the first member 412 and the second opening 434 may be sized to receive the second member 414. The first member 412 may be inserted within the first opening 432 and then the attachment 402 may slide downward for the second member 414 to be inserted within the second opening and such that a support member 440 of the attachment 402 rests upon the pair of support flanges 428. The arrangement between the support member 440 and the pair of support flanges 428 is such that the pair of support flanges 428 may assist in receiving a force applied to the attachment 402. The first opening 432 and the second opening 434 may be arranged on the bracket 408 to provide space for disposal of the cover plate 406 between the attachment 402 and the bracket 408.

It is contemplated that the bracket 408 may have alternative configurations. For example, FIGS. 17 and 18 show additional examples of a bracket for the back plate assembly 400. FIG. 17 shows a bracket 450 including side flanges 452 having an arcuate shape. FIG. 18 shows a mount bracket 460 having a receiving aperture 462 disposed above and below a first flange 468 and a second flange 470. Each of the flanges defines an opening 474 located on the mount bracket 460 such that a base portion of an attachment may rest against a surface of the mount bracket 460 defining the receiving apertures 462.

Each of the back plate assemblies described above may provide a relatively low profile design to mount a home hardware product to a surface. These low profiles may provide options for lower profile decorative covers while removing structural support requirements for the decorative cover. As such, the decorative covers may be made from ultra-thin die cast, stamped metal, or injection molded plastic which may provide lower cost options and simplify manufacturing processes associated therewith. Further, each of the embodiments described above may utilize a cantilever principal in which the attachments are supported by at least two points of contact with the base.

While various embodiments are described above, it is not intended that these embodiments describe all possible forms of the invention. Rather, the words used in the specification are words of description rather than limitation, and it is understood that various changes may be made without departing from the spirit and scope of the present disclosure. Additionally, the features of various implementing embodiments may be combined to form further embodiments of the invention.

What is claimed is:

1. A twist-lock back plate assembly for home hardware comprising:
   a base including at least one mount aperture and adapted to be mounted to a support surface, the base defining a receptacle and a through-hole, a pair of grooves disposed at an outer edge of the through-hole, and a pair of ledges offset from an inner edge of the through-hole; and
   an attachment including a lock member with a pair of lock features and a connector member sized for insertion between the pair of ledges when the attachment is oriented in a first radial position,
   wherein the receptacle extends outward from the base and toward the attachment, wherein each of the pair of lock features is positioned on the attachment such that the connector member and the pair of lock features may be inserted into the through-hole simultaneously, and wherein the connector member rests directly against the ledges and each of the pair of lock features rests within one of the pair of grooves when the attachment is rotated to a second radial position.

2. The assembly of claim 1 further comprising a cover plate, wherein the attachment further defines a flared end, and wherein the cover plate is sized for disposal between an outer portion of the receptacle and the flared end of the attachment.

3. The assembly of claim 1 further comprising a cover plate sized for disposal between the base and the attachment to conceal the base.

4. The assembly of claim 1, wherein the attachment is a hook.

5. The assembly of claim 1, wherein the through-hole is sized for rotation of the lock member and lock features until each of the lock features sits within one of the pair of grooves.

6. The assembly of claim 1, wherein each of the grooves and each of the lock features defines a taper to permit annular deformation of the base when the attachment is mounted to the base and a force is applied to the attachment.

7. The assembly of claim 1, wherein the ledges and attachment are arranged with one another such that the attachment is prevented from moving in a direction away from the support surface when the attachment is oriented in the second radial position.

* * * * *